United States Patent
You et al.

(10) Patent No.: US 10,538,161 B2
(45) Date of Patent: Jan. 21, 2020

(54) VEHICLE SYSTEM AND BATTERY CHARGING METHOD THEREOF

(71) Applicants: HYUNDAI MOTOR COMPANY, Seoul (KR); KIA MOTORS CORPORATION, Seoul (KR)

(72) Inventors: Hyun Jong You, Uiwang-si (KR); Ho Uk Nam, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 57 days.

(21) Appl. No.: 15/369,509

(22) Filed: Dec. 5, 2016

(65) Prior Publication Data

US 2017/0326983 A1 Nov. 16, 2017

(30) Foreign Application Priority Data

May 16, 2016 (KR) .......................... 10-2016-0059580

(51) Int. Cl.
*B60K 35/00* (2006.01)
*G01C 21/36* (2006.01)

(52) U.S. Cl.
CPC .......... *B60K 35/00* (2013.01); *G01C 21/3697* (2013.01); *B60K 2370/155* (2019.05); *B60K 2370/186* (2019.05); *B60K 2370/52* (2019.05)

(58) Field of Classification Search
USPC ....................................................... 701/123
See application file for complete search history.

(56) References Cited

U.S. PATENT DOCUMENTS

| | | | | |
|---|---|---|---|---|
| 5,301,113 A | * | 4/1994 | To | G01F 9/001 701/123 |
| 9,644,980 B2 | * | 5/2017 | Stankoulov | G01C 21/3469 |
| 2010/0268411 A1 | | 10/2010 | Taguchi | |
| 2012/0026173 A1 | * | 2/2012 | Gabbert | G05B 19/0426 345/473 |
| 2013/0179057 A1 | * | 7/2013 | Fisher | B60L 53/68 701/117 |
| 2014/0278038 A1 | * | 9/2014 | Stankoulov | G01C 21/3469 701/123 |

(Continued)

FOREIGN PATENT DOCUMENTS

| | | |
|---|---|---|
| JP | 2010-161899 A | 7/2010 |
| JP | 2010-252449 A | 11/2010 |

(Continued)

OTHER PUBLICATIONS

English translaton of Korean Patent Pub. No. KR 101865928 B1 from google patents (dated Apr. 8, 2019).*

(Continued)

*Primary Examiner* — Jean Paul Cass
(74) *Attorney, Agent, or Firm* — Morgan, Lewis & Bockius LLP

(57) ABSTRACT

A vehicle system includes: a battery; a display; an input; and a processor configured to display a user interface for setting a distance-to-empty (DTE) value after charging or a charge time on the display, to receive a user input for setting a distance-to-empty (DTE) value after charging or for setting a charge time through the user interface, and to charge the battery according to the set DTE after charging or charge time.

10 Claims, 4 Drawing Sheets

(56) References Cited

U.S. PATENT DOCUMENTS

| | | | | |
|---|---|---|---|---|
| 2015/0298565 | A1* | 10/2015 | Iwamura | G01C 21/3476 701/22 |
| 2016/0153796 | A1* | 6/2016 | Stankoulov | B60W 40/1005 701/123 |
| 2016/0305791 | A1* | 10/2016 | Neubecker | B60L 58/12 |
| 2017/0136889 | A1* | 5/2017 | Ricci | B60L 11/182 |
| 2017/0136908 | A1* | 5/2017 | Ricci | B60L 11/1831 |
| 2017/0136911 | A1* | 5/2017 | Ricci | B60L 58/12 |
| 2017/0199047 | A1* | 7/2017 | Stankoulov | G01C 21/3469 |
| 2017/0326983 | A1* | 11/2017 | You | G01C 21/3469 |

FOREIGN PATENT DOCUMENTS

| | | |
|---|---|---|
| KR | 10-2013-0050461 A | 5/2013 |
| KR | 10-2014-0015740 A | 2/2014 |
| KR | 10-2014-0039110 A | 4/2014 |
| KR | 10-2014-0083555 A | 7/2014 |
| KR | 10-2014-0084543 A | 7/2014 |
| KR | 10-2014-0118364 A | 10/2014 |
| KR | 10-2015-0029111 A | 3/2015 |
| KR | 10-2015-0052965 A | 5/2015 |
| KR | 101865928 B1 * | 7/2018 |
| WO | 2012/098660 A1 | 7/2012 |

OTHER PUBLICATIONS

Korean Office Action issued in Application No. 10-2016-0059580 dated Jan. 10, 2018, with English translation.
Korean Office Action issued in Application No. 10-2016-0059580 dated Aug. 23, 2017.
Korean Office Action issued in Application No. 10-2016-0059580 dated Jun. 15, 2018.

* cited by examiner

VEHICLE SYSTEM AND BATTERY CHARGING METHOD THEREOF

CROSS-REFERENCE TO RELATED APPLICATION

This application is based on and claims the benefit of priority to Korean Patent Application No. 10-2016-0059580, filed on May 16, 2016, in the Korean Intellectual Property Office, the disclosure of which is incorporated herein in its entirety by reference.

TECHNICAL FIELD

The present disclosure relates to a method and system for charging a battery included in a vehicle.

BACKGROUND

As electronic technologies have advanced, various types of electronic devices have been applied to vehicles. In particular, recently, techniques for driving a vehicle using electric power supplied from a battery, in addition to a raw material such as gasoline, a gas, and the like, have been developed.

When a battery is used as a driving source of a vehicle, the battery is required to be periodically charged for driving the vehicle. When charging the battery, a user may set a charge amount of the battery such as 80%, 100%, and the like, and charge the battery according to the set charge amount.

SUMMARY

The present disclosure has been made to solve the above-mentioned problems occurring in the prior art while advantages achieved by the prior art are maintained intact.

An aspect of the present disclosure provides a vehicle system and a battery charging method thereof, capable of setting a charge amount in various manners according to user situations and providing various types of required information to a user when a charge amount is set in consideration of a distance to a navigation destination, real-time traffic information, and the like.

According to an exemplary embodiment of the present disclosure, a vehicle system includes: a battery; a display; an input; and a processor configured to display a user interface for setting a distance-to-empty (DTE) value after charging or a charge time on the display, to receive a user input for setting the DTE value after charging or for setting the charge time through the user interface, and to charge the battery according to the set DTE after charging or charge time.

According to another exemplary embodiment of the present disclosure, a battery charging method of a vehicle system includes: displaying, on a display, a user interface for setting a distance-to-empty (DTE) value after charging or for setting a charge time; receiving a user input for setting the DTE value after charging or for setting the charge time through the user interface; and charging a battery according to the set DTE after charging or according to the set charge time.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
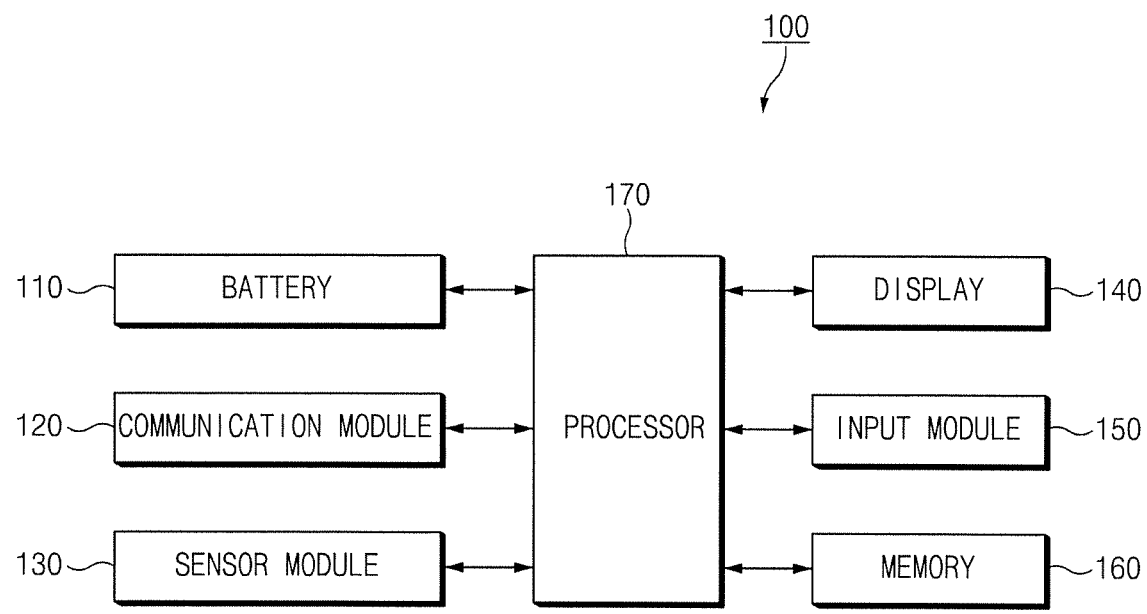
FIG. 1 is a block diagram illustrating a configuration of a vehicle system according to an exemplary embodiment of the present disclosure.

FIG. 1 is a block diagram illustrating a configuration of a vehicle system according to an exemplary embodiment of the present disclosure.

Referring to FIG. 1, a vehicle system 100 may include a battery 110, a communicator 120, a sensor 130, a display 140, an input 150, a memory 160, and a processor 170.

According to an exemplary embodiment, the battery 110 may supply electric power to each of the components included in the vehicle system 100. For example, the battery 110 may supply electric power to the communicator 120, the sensor 130, the display 140, the input 150, the memory 160, and the processor 170. In another example, the battery 110 may supply electric power to a motor (not shown) of a vehicle including the vehicle system 100. The vehicle including the vehicle system 100 may be a hybrid vehicle or an electric vehicle in which a motor is driven using electric power supplied from the battery 110. According to an exemplary embodiment, the battery 110 may be implemented as a rechargeable or dischargeable secondary battery.

According to an exemplary embodiment, the vehicle system 100 may further include a power management module (not shown). The power management module (not shown) may manage electric power of the vehicle system 100 by controlling the battery 110. According to an exemplary embodiment, the power management module (not shown) may include, for example, a power management integrated circuit (PMIC), a charger integrated circuit (IC), or a battery or fuel gauge. The battery gauge may measure a remaining capacity, voltage, current, or temperature of the battery 110.

According to an exemplary embodiment, the communicator may communicate with an external device. The communicator 120 may include a global navigation satellite system (GNSS) module. The communicator 120 (e.g., the GNSS module) may receive position information and real-time traffic information from satellites.

According to an exemplary embodiment, the sensor 130 may sense a state of the vehicle. For example, the sensor 130 may sense a velocity or a driving distance of a vehicle. For example, the sensor 130 may sense a revolutions per minute (RPM) of a motor (not shown) and calculate a velocity or a driving distance of a vehicle using the RPM of the motor. For example, the sensor 130 may sense a wheel speed and calculate a velocity or a driving distance of a vehicle using the wheel speed.

According to an exemplary embodiment, the display 140 may display various types of information (or content). The display 140 may be positioned in a center fascia or in a cluster of the vehicle. The display 140 may display a user interface for setting a distance to empty (DTE) value after charging or a charge time (or a charge duration).

According to an exemplary embodiment, the input 150 (or a user input device or module) may receive (or sense) a user input. The input 150 may include a touch sensor panel sensing a user's touch operation or a pen sensor panel (e.g., a digitizer) for sensing a user's pen operation. According to an exemplary embodiment, the input 150 may include a motion recognition sensor recognizing a user's motion or a voice recognition sensor recognizing a user's voice.

According to an exemplary embodiment, the input 150 may receive a user input for setting a DTE value after charging or a charge time. According to an exemplary embodiment, the input 150 may receive a user input for setting a navigation destination.

According to an exemplary embodiment, regarding the display 140 and the input 150, an input panel may be disposed above a display panel to implement a touch screen capable of performing both displaying and sensing a touch operation.

According to an exemplary embodiment, the memory 160 may store information related to a user interface for charging a battery. For example, the memory 160 may store an image object included in a user interface. According to an exemplary embodiment, the memory 160 may store information regarding an average mileage of a vehicle. According to an exemplary embodiment, the memory 160 may store an application (or a program) providing navigation information.

According to an exemplary embodiment, the processor 170 may control a general operation of the vehicle system 100. For example, the processor 170 may display a user interface by controlling each of the battery 110, the communicator 120, the sensor 130, the display 140, the input 150, and the memory 160. The processor 170 (e.g., a microcontroller) may be implemented as a system-on-chip (SoC) including a central processing unit (CPU), a graphic processing unit (GPU), a memory, and the like.

The various embodiments disclosed herein, including embodiments of the vehicle system and/or elements thereof, can be implemented using one or more processors coupled to a memory (or other non-transitory machine readable recording medium) storing computer-executable instructions for causing the processor(s) to perform the functions described above.

The processor 170 may display a user interface for setting a distance to empty (DTE) value after charging or a charge time on the display 140. The processor 170 may receive a user input for setting the DTE value after charging or a charge time through the user interface displayed on the display 140. The processor 170 may charge the battery 110 according to a user input.

According to an exemplary embodiment, the processor 170 may display at least one of a DTE value after charging and a charge time on the display 140 in operation S430. The processor 170 may further display an object indicating a current battery capacity (or a remaining electric power amount of battery) and a battery capacity after charging on the display 140.

Figure 2B:
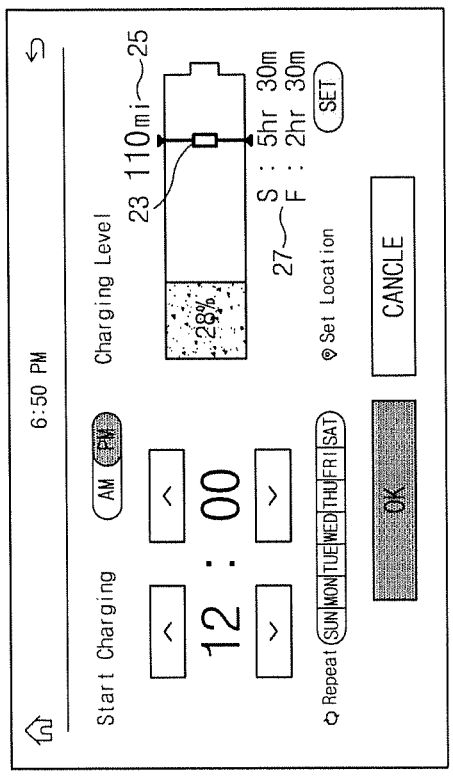
FIGS. 2A and 2B are views illustrating examples of a user interface according to an exemplary embodiment of the present disclosure.
Figure 2A:
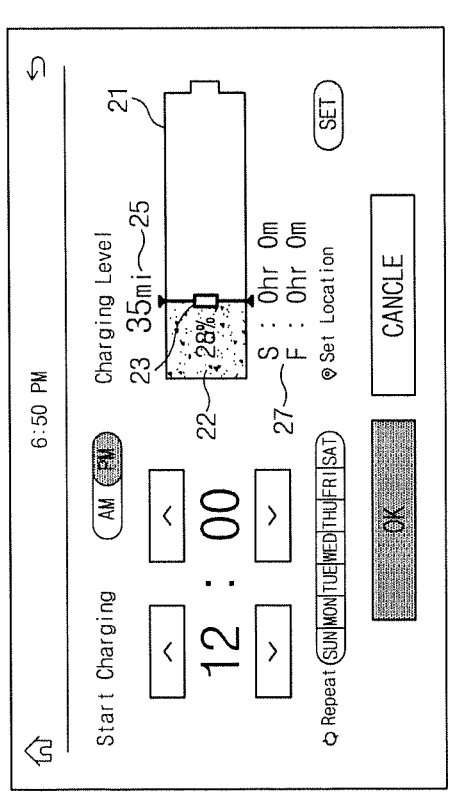

FIGS. 2A and 2B are views illustrating examples of a user interface according to an exemplary embodiment of the present disclosure.

Referring to FIG. 2A, a user interface may include a battery object 21. The battery object 21 may include a region 22 indicating a current battery capacity.

According to an exemplary embodiment, the user interface may include a slide bar 23 for setting a DTE value after charging or the charge time. According to an exemplary embodiment, when initially displayed, the slide bar 23 may be displayed in a position corresponding to a current battery capacity (or also known as state of charge). For example, referring to FIG. 2B, the slide bar 23 may be displayed in a position corresponding to a battery capacity of 28%.

According to an exemplary embodiment, the user interface may include an object 25 indicating a DTE value after charging. The object 25 indicating a DTE after charging may include information regarding a total of DTE after charging including the current battery capacity, for example.

According to an exemplary embodiment, the processor 170 may calculate an average mileage using driving distance information and battery consumption sensed by the sensor 130. For example, the processor 170 may calculate an average mileage by dividing a driving distance by battery capacity (or electric power amount) consumed by the motor. The processor 170 may store the calculated average mileage information in the memory 160.

According to an exemplary embodiment, with the user interface displayed, the processor 170 may determine whether a navigation destination has been set. When a navigation destination has not been set, the processor 170 may calculate a DTE value after charging on the basis of the average mileage information. For example, the DTE value of 25 after charging as illustrated in FIGS. 2A and 2B may have been calculated on the basis of the average mileage information. The processor 170 may calculate the DTE value after charging using the average mileage information stored in the memory 160 and a battery capacity after charging. For example, the processor 170 may calculate a DTE value after charging by multiplying the average mileage information and the battery capacity after charging.

According to an exemplary embodiment, the user interface may include an object 27 indicating a charge time. The object 27 indicating a charge time may include a plurality of pieces of charge time information according to charging methods. For example, the object 27 indicating a charge time may indicate both a charge time according to slow charge S and a charge time according to fast charge F.

According to an exemplary embodiment, the processor 170 may differentiate a current battery capacity from the battery capacity after charging, and divide the differentiated battery capacity by charge electric power (e.g., slow charge electric power and fast charge electric power) to calculate an estimated charge time.

According to an exemplary embodiment, the slide bar 23 may be moved along a horizontal axis of the battery object 21 according to a user input. The user may move the slide bar 23 with reference to the object 25 indicating a DTE value after charging or the object 27 indicating a charge time. For example, referring to FIG. 2B, the slide bar 23 may be moved in a rightward direction from an initially displayed position according to a user input.

According to an exemplary embodiment, the DTE value after charging may be changed according to a position of the slide bar 23. For example, referring to FIGS. 2A and 2B, as the position of the slide bar 23 is changed, the DTE value after charging may be changed from 35 miles to 110 miles so as to be displayed.

According to an exemplary embodiment, the charge time may be changed according to a position of the slide bar 23. For example, referring to FIGS. 2A and 2B, as the position of the slide bar 23 is changed, the charge time may be changed from 0 hour and 0 minute to 5 hours and 30 minutes in the case of the slow charge S and from 0 hour and 0 minute to 2 hours and 30 minutes in the case of the fast charge F.

The exemplary embodiment in which the user interface includes information related to both the DTE value after charging and the charge time according to positions of the slide bar 23 has been described with reference to FIGS. 2A and 2B, but the user interface may include only any one of the DTE value after charging and the charge time.

The user may set a DTE value after charging or a charge time, rather than a change amount, using the slide bar 23 included in the user interface. Thus, the user may charge the battery by a required amount according to situations. For example, in a case in which a charge time is limited as the vehicle is scheduled to be driven in three hours, the user may charge the battery by setting a charge time, or in a case in which the vehicle is scheduled to be driven to a specific destination, the user may charge the battery by setting a driving distance to the destination.

Figure 3:
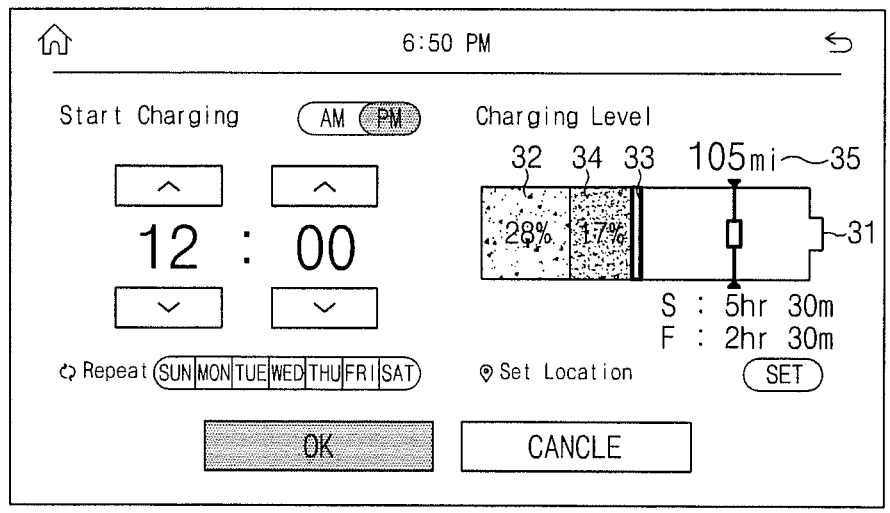
FIG. 3 is a view illustrating an example of a user interface according to an exemplary embodiment of the present disclosure.

FIG. 3 is a view illustrating an example of a user interface according to an exemplary embodiment of the present disclosure.

Referring to FIG. 3, the user interface may include a battery object 31. The battery object 31 may include a region 32 indicating a current battery capacity.

The user interface may include an object 33 indicating a battery capacity required for reaching a navigation destination. According to an exemplary embodiment, with the user interface being displayed, the processor 170 may determine whether a navigation destination has been set. When the navigation destination has been set, the processor 170 may calculate a battery capacity required for reaching the navigation destination. According to an exemplary embodiment, the processor 170 may calculate a battery capacity (or electric power amount) required for reaching the navigation destination on the basis of average mileage information and real-time traffic information. The processor 170 may correct the average mileage information using the real-time traffic information to reach the destination and divide a distance from a starting position to the destination by the corrected average mileage to calculate a battery capacity required for reaching the destination.

According to an exemplary embodiment, when correcting the average mileage information using the real-time traffic information, the processor 170 may assort roads included in a route from the starting position to the destination and correct an average mileage of each road. The processor 170 may calculate a battery capacity required for each road by dividing a distance of each road by the corrected mileage of each road. For example, the processor 170 may assort the route from the starting position to the destination into three roads (e.g., a first road (30 kilometers), a second road (10 kilometers), and a third road (5 kilometers). When an average mileage is 20 km/kWh, the processor 170 may correct a mileage of the first road to 25 km/kWh, a mileage of the second road to 15 km/kWh, and a mileage of the third road to 18 km/kWh. Accordingly, a battery capacity required for driving the first road may be $30/25$ kWh, a battery capacity required for driving the second road may be $10/15$ kWh, and a battery capacity required for driving the third road may be $5/18$ kWh. The processor 170 may add the battery capacity required for each load to calculate a battery capacity required for reaching the destination.

The user interface may include an object indicating a charge amount required for reaching the navigation destination. For example, referring to FIG. 3, the battery object 31 may include a region 34 indicating a charge amount required for reaching the navigation destination.

According to an exemplary embodiment, when the navigation destination has been set, the processor 170 may compare a current battery capacity and a battery capacity required for reaching the navigation destination. When the current battery capacity is smaller than the battery capacity required for reaching the navigation destination, the processor 170 may calculate a charge amount required for reaching the navigation destination. For example, the processor 170 may calculate a charge amount required for reaching the navigation destination by differentiating the current battery capacity from the battery capacity required for reaching the navigation destination.

According to an exemplary embodiment, the user interface may include an object 35 indicating a DTE value after charging. The object 35 indicating the DTE value after charging may include information regarding the DTE value after charging including a current battery capacity.

According to an exemplary embodiment, when a navigation destination has been set, the processor 170 may calculate the DTE value after charging on the basis of average mileage information and real-time traffic information. For example, the DTE value of 35 after charging illustrated in FIG. 3 may have been calculated on the basis of average mileage information and real-time traffic information. The processor 170 may calculate the DTE value after charging using average mileage information stored in the memory 160, real-time traffic information received through the communicator 120, and a battery capacity after charging. For example, the processor 170 may correct average mileage information using the real-time traffic information to the destination and multiply the corrected average mileage information and the battery capacity after charging to calculate the DTE value after charging.

Figure 4:
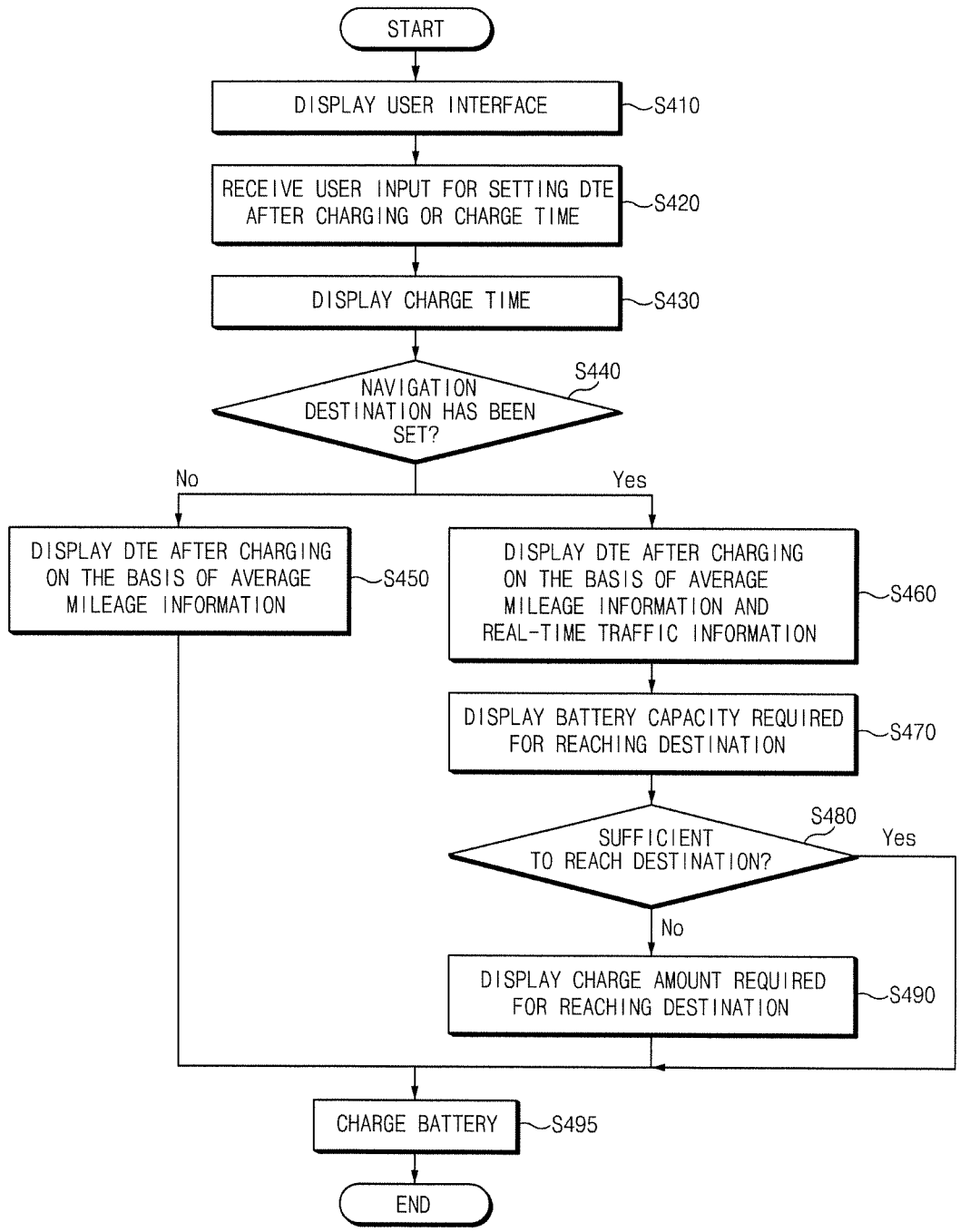
FIG. 4 is a flow chart illustrating a battery charging method of a vehicle system according to an exemplary embodiment of the present disclosure.

FIG. 4 is a flow chart illustrating a battery charging method of a vehicle system according to an exemplary embodiment of the present disclosure.

The flow chart illustrated in FIG. 4 may include operations processed in the vehicle system 100 illustrated in FIG. 1. Thus, hereinafter, the content described regarding the vehicle system 100 with reference to FIGS. 1 to 3 may also be applied to the flow chart illustrated in FIG. 4, even though content thereof is omitted.

According to an exemplary embodiment, the vehicle system 100 may display a user interface for setting a DTE value after charging or a charge time on the display 140 in operation S410.

According to an exemplary embodiment, the vehicle system 100 may receive a user input for setting a DTE value after charging or a charge time in operation S420. The vehicle system 100 may receive a user input through the user interface displayed on the display 140. For example, the vehicle system 100 may receive a user input through a slide bar included in the user interface.

According to an exemplary embodiment, the vehicle system 100 may display a charge time on the display 140. For example, the vehicle system 100 may display a charge time corresponding to a user input. The vehicle system 100 may display both a charge time according to slow charge S and a charge time according to fast charge F.

According to an exemplary embodiment, the vehicle system 100 may calculate an estimated charge time by differentiating a current battery capacity from the DTE value after charging and dividing the differentiated battery capacity by a charge electric power (e.g., slow charge electric power and fast charge electric power).

According to an exemplary embodiment, the vehicle system 100 may determine whether a navigation destination has been set in operation S440.

According to an exemplary embodiment, when a navigation destination has not been set (S440: No), the vehicle system 100 may display a DTE value after charging on the display on the basis of average mileage information in operation S450. For example, the vehicle system 100 may calculate a DTE value after charging using a battery capacity after charging and average mileage information stored in the memory 160. The vehicle system 100 may calculate a DTE value after charging by multiplying the average mileage information and the battery capacity after charging.

According to an exemplary embodiment, after operation S450, the vehicle system 100 may charge the battery 110 on the basis of the user input received in operation S420, in operation S495.

According to an exemplary embodiment, when a navigation destination has been set (S440: Yes), the vehicle system 100 may display a DTE value after charging on the basis of the average mileage information and real-time traffic information on the display 140 in operation S460. For example, the vehicle system 100 may correct the average mileage information using real-time traffic information to reach a destination and multiply the corrected average mileage information and the battery capacity after charging to calculate the DTE value after charging.

According to an exemplary embodiment, the vehicle system 100 may display a battery capacity required for reaching the destination on the display 140 in operation S470. According to an exemplary embodiment, the vehicle system 100 may calculate a battery capacity (or electric power amount) to reach the navigation destination on the basis of average mileage information and real-time traffic information. The vehicle system 100 may correct the average mileage information using the real-time traffic information to reach the destination and divide a distance from a starting position to the destination by the corrected average mileage to calculate a battery capacity required for reaching the destination.

According to an exemplary embodiment, when correcting the average mileage information using the real-time traffic information, the vehicle system 100 may assort roads included in a route from the starting position to the destination and correct an average mileage of each road. The vehicle system 100 may calculate a battery capacity required for each road by dividing a distance of each road by the corrected mileage of each road.

According to an exemplary embodiment, the vehicle system 100 may compare the current battery capacity with the battery capacity required for reaching the navigation destination to determine whether the current battery capacity is sufficient to reach the navigation destination in operation S480.

According to an exemplary embodiment, when the current battery capacity is sufficient to reach the navigation destination (S480: Yes), the vehicle system 100 may charge the battery 110 on the basis of the user input received in operation S420, in operation S495.

According to an exemplary embodiment, when the current battery capacity is not sufficient to reach the navigation destination (S480: No), the vehicle system 100 may display a charge amount required for reaching the navigation destination on the display 140. The vehicle system 100 may calculate the charge amount required for reaching the navigation destination by differentiating the current battery capacity from the battery capacity required for reaching the navigation destination. Thereafter, the vehicle system 100 may charge the battery 110 on the basis of the user input received in operation S420, in operation S495.

According to an exemplary embodiment, in a case in which the user resets the DTE value after charging or the charge time before performing the operation S495 of charging the battery, some of operations S420 to S490 may be performed again. In an exemplary embodiment, some of the operations illustrated in FIG. 4 may be omitted.

As described above, according to various exemplary embodiments, a battery charge capacity may be freely set by selecting a DTE value for charging or a charge time according to a user situation.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A vehicle system comprising:
   a battery;
   a display;
   an input; and
   a processor configured to:
   display, on the display, a user interface for setting a distance-to-empty (DTE) value after charging,
   receive a user input for setting the DTE value through the user interface, and
   charge the battery according to the set DTE value,
   wherein the user interface includes a slide bar for setting the DTE value,
   wherein, when initially displayed, the slide bar is displayed on the display in a position corresponding to a current battery capacity,
   wherein the slide bar is movable along an axis by a user's manipulation, and
   wherein the DTE value is displayed adjacent to the slide bar on the display based on a current position of the slide bar.

2. The vehicle system according to claim 1, wherein the processor displays at least one of the current battery capacity, a first battery capacity after charging, or the DTE value after charging.

3. The vehicle system according to claim 1, wherein
   when a navigation destination has not been set, the processor calculates the DTE value on the basis of average mileage information, and
   when the navigation destination has been set, the processor calculates the DTE value on the basis of the average mileage information and real-time traffic information.

4. The vehicle system according to claim 1, wherein
   when a navigation destination has been set, the processor calculates a second battery capacity required for reaching a navigation destination.

5. A battery charging method of a vehicle system, the battery charging method comprising:
   displaying, on a display, a user interface for setting a distance-to-empty (DTE) value after charging;
   receiving a user input for setting the DTE value through the user interface; and
   charging a battery according to the set DTE value,
   wherein the user interface includes a slide bar for setting the DTE value, wherein, when initially displayed, the slide bar is displayed on the display in a position corresponding to a current battery capacity, wherein the slide bar is movable along an axis by a user's manipulation, and wherein the DTE value is displayed adjacent to the slide bar on the display based on a current position of the slide bar.

6. The battery charging method according to claim 5, further comprising:

displaying at least one of the current battery capacity, a first battery capacity after charging, or the DTE value on the display.

7. The battery charging method according to claim 5, further comprising:

determining whether a navigation destination has been set;

calculating, when the navigation destination has not been set, the DTE value on the basis of average mileage information; and calculating, when the navigation destination has been set, the DTE value after charging on the basis of the average mileage information and traffic information.

8. The battery charging method according to claim 5, wherein a second battery capacity required for reaching a navigation destination is obtained when the navigation destination has been set.

9. The vehicle system according to claim 4, wherein when the current battery capacity is smaller than the second battery capacity, the processor calculates a charge amount required for reaching the navigation destination and displays an object indicating the required charge amount on the display.

10. The battery charging method according to claim 8, further comprising:

calculating, when the current battery capacity is smaller than the second battery capacity, a charge amount required for reaching the navigation destination; and displaying an object indicating the required charge amount on the display.

* * * * *